United States Patent
Chou et al.

(10) Patent No.: US 11,733,500 B2
(45) Date of Patent: Aug. 22, 2023

(54) SURFACE COLOR AND LIQUID CONTACT ANGLE IMAGING

(71) Applicant: Essenlix Corporation, Monmouth Junction, NJ (US)

(72) Inventors: Stephen Y. Chou, Princeton, NJ (US); Wei Ding, Princeton, NJ (US); Wu Chou, Basking Ridge, NJ (US); Ji Qi, Hillborough, NJ (US); Jun Tian, Belle Mead, NJ (US); Yuecheng Zhang, Yardley, PA (US); Mingquan Wu, Princeton Junction, NJ (US)

(73) Assignee: Essenlix Corporation, Monmouth Junction, NJ (US)

( * ) Notice: Subject to any disclaimer, the term of this patent is extended or adjusted under 35 U.S.C. 154(b) by 0 days.

(21) Appl. No.: 17/266,475

(22) PCT Filed: Aug. 16, 2019

(86) PCT No.: PCT/US2019/046830
§ 371 (c)(1),
(2) Date: Feb. 5, 2021

(87) PCT Pub. No.: WO2020/037210
PCT Pub. Date: Feb. 20, 2020

(65) Prior Publication Data
US 2021/0263294 A1    Aug. 26, 2021

Related U.S. Application Data (60) Provisional application No. 62/764,888, filed on Aug. 16, 2018.

(51) Int. Cl.
H04N 23/51 (2023.01)
H04N 23/55 (2023.01)
(Continued)

(52) U.S. Cl.
CPC .......... *G02B 21/0008* (2013.01); *G01J 3/524* (2013.01); *G02B 21/0032* (2013.01);
(Continued)

(58) Field of Classification Search
CPC .............. G02B 21/0008; G02B 21/361; G03B 2217/002; G01N 33/48; G01N 33/53;
(Continued)

(56) References Cited

U.S. PATENT DOCUMENTS

2014/0286550 A1   9/2014  Beule et al.
2016/0004057 A1   1/2016  Lin et al.
(Continued)

FOREIGN PATENT DOCUMENTS

WO      2014037820 A3     3/2014
WO   WO-2014/037820 A2 *  3/2014

OTHER PUBLICATIONS

International Preliminary Report on Patentability for PCT/US2019/046830 established by IPEA/US completed on Sep. 28, 2020.
(Continued)

*Primary Examiner* — Andrew W Johns (57) ABSTRACT

Disclosed is an apparatus and method for imaging: a side-view of a object on a surface, a Contact Angle of a liquid object, the color of an object, or combinations thereof.

35 Claims, 8 Drawing Sheets

(51) Int. Cl.
  *G02B 21/00* (2006.01)
  *G06T 7/90* (2017.01)
  *G06N 20/00* (2019.01)
  *G01J 3/52* (2006.01)

(52) U.S. Cl.
  CPC ............... *G06N 20/00* (2019.01); *G06T 7/90* (2017.01); *H04N 23/51* (2023.01); *H04N 23/55* (2023.01)

(58) Field of Classification Search
  CPC .. H04N 5/2252; H04N 5/2256; H04N 5/2257; H04N 23/51; H04N 23/56; H04N 23/57
  See application file for complete search history.

(56) References Cited

U.S. PATENT DOCUMENTS

| | | |
|---|---|---|
| 2016/0174836 A1 | 6/2016 | Bower et al. |
| 2017/0138901 A1 | 5/2017 | Norton |
| 2017/0224251 A1 | 8/2017 | Ahmad et al. |
| 2018/0082103 A1 | 3/2018 | Riopka et al. |

OTHER PUBLICATIONS

Written Opinion of the International Searching authority for PCT/US2019/048043 established by ISA/US completed on Feb. 19, 2020.

\* cited by examiner

SURFACE COLOR AND LIQUID CONTACT ANGLE IMAGING

CROSS-REFERENCE TO RELATED APPLICATIONS

This application is a National Stage entry (§ 371) application of International Application No. PCT/US2019/046830, filed on Aug. 16, 2019, which claims the benefit of priority of U.S. Provisional Patent Application No. 62/764,888, filed on Aug. 16, 2018, the contents of which is relied upon and incorporated herein by reference in its entirety. The entire disclosure of any publication or patent document mentioned herein is entirely incorporated by reference.

FIELD

Among other things, the present invention is related to devices and methods of performing biological and chemical assays, and computational imaging.

BACKGROUND

In biological and chemical assays (e.g., diagnostic testing), often it needs to simple, fast, and sensitive assaying, including imaging. The present invention provides, among other thing, devices and methods for simple, fast, and sensitive assaying, including imaging.

SUMMARY

One aspect of the present disclosure provides the devices and methods to image the contact angle, a side-view of a small liquid droplet on a surface, or both, using an adaptor that is attached to a smartphone, and using the camera and the light source on a smartphone.

Another aspect of the disclosure provides an apparatus and methods to image and analyze the color of a surface, particularly to make the color measurement insensitive to lighting.

Another aspect of the disclosure provides a compact color calibration card inside an optical adaptor to make a color measurement insensitive to a lighting.

Another aspect of the disclosure provides devices and methods that can connect a light source of a smartphone with an optical adaptor easily and flexibly using an optical fiber.

BRIEF DESCRIPTION OF THE DRAWINGS

The skilled artisan will understand that the drawings, described below, are for illustration purposes only. The drawings are not intended to limit the scope of the present teachings in any way. The drawings are not entirely in scale.

DETAILED DESCRIPTION OF EXEMPLARY EMBODIMENTS

The following detailed description illustrates some embodiments of the invention by way of example and not by way of limitation. The section headings and any subtitles used herein are for organizational purposes only and are not to be construed as limiting the subject matter described in any way. The contents under a section heading and/or subtitle are not limited to the section heading and/or subtitle but apply to the entire description of the present invention.

Several exemplary embodiments are illustrated as follows:

an optical adaptor for bright-field and fluorescent microscopy imaging attached to a smartphone;

an optical adaptor for colorimetric measurement attached to a smartphone using tilted fiber end face as light source;

an optical adaptor for colorimetric measurement attached to a smartphone using side-illumination of a ring-shape fiber as light source;

a device and methods of tomography;

a machine learning assisted assay and imaging;

a device and methods for tissue staining and cell imaging; and a dual-lens imaging system.

A-1. Imaging of Liquid Contact Angle and Side-View of an Object on a Surface

Figure 1:
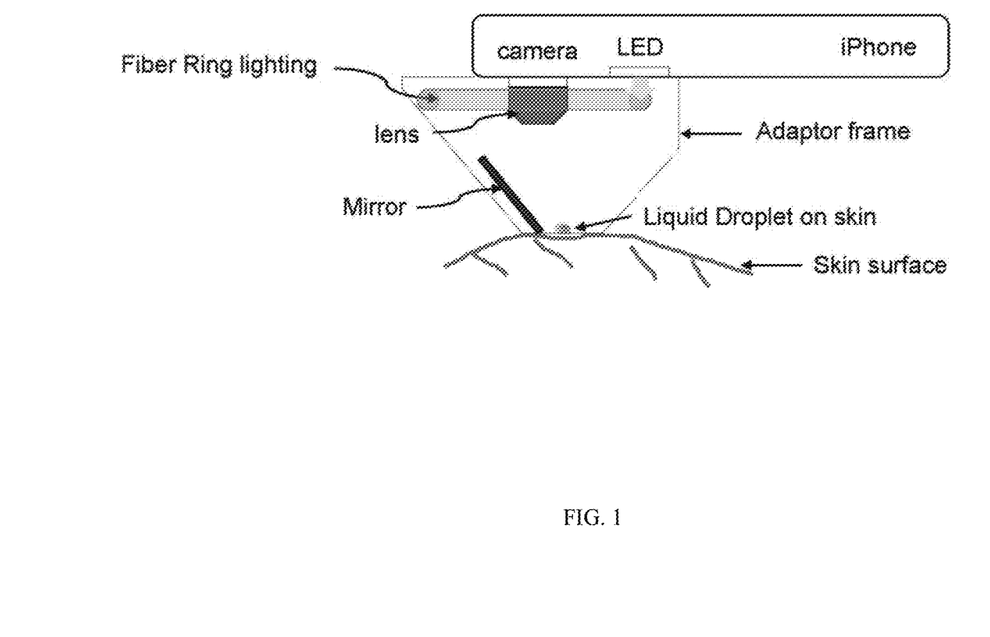
FIG. 1 shows a schematic of an optical system having a smartphone to observe and measure the contact angle of a liquid droplet on a surface such as mammalian skin.

FIG. 1 shows a schematic of an optical system having a smartphone to observe and measure the contact angle of a small liquid droplet on a surface such as mammalian skin. FIG. 1 illustrates a device and methods of the disclosure for imaging the contact angle, a side-view of a small liquid droplet (and/or other small object) on a surface, or both, using an adaptor that is attached to the smartphone and using the camera and the light source on a smartphone.

According to one embodiment, the disclosure provides an apparatus for imaging side-view of a small object on a surface, comprising: (a) an optical enclosure (also termed "adaptor, (b) a side-mirror, (c) light source, and (d) a camera;

wherein the enclosure connects houses the side-mirror, the light source, and the camera, wherein the enclosure has opening to fit on a surface that has a small object (such as a small liquid droplet), wherein the enclosure prevents or reduces the ambient light getting inside of the enclosure during a measurement of the small object;

wherein the side-mirror is at a tilted angle from the optical axis of the measurement;

wherein the optical axis of the measurement is determined by the axis going through the center of the camera and perpendicular to the surface where the small object is situated;

wherein the light source is above the surface and can have a ring shape which can be, for example, centro-symmetric relative to the center of the camera; and wherein the camera has an imaging sensor and imaging lens.

As an example, FIG. 1 Illustrates an adaptor for imaging an assaying device in accordance with some embodiments. The adaptor comprises a housing that can be attached to the smartphone. The adaptor has a side-emitting fiber ring, an imaging lens, a mirror, and an opening. In FIG. 1, a side-emitting fiber is placed around the imaging lens and under the camera. The side-emitting fiber has a circle shape which is centrosymmetric relative to the imaging lens. The two end faces of the fiber are placed towards the LED of a smartphone. The light emitted from the LED gets coupled into the fiber through the end faces and uniformly emits from the fiber along the side wall. There is an opening at the bottom of the adaptor for sampling. When imaging a contact angle of a droplet on a surface, the adaptor can be pressed onto a surface and the droplet of interest can be positioned in the opening area. A mirror is mounted directly under the imaging lens and the mirror is tilted at an angle, for example, a 45 degree angle, relative to the optical axis of imaging lens and camera. The function of the mirror allows the camera to see the contact angle of the liquid from a side view.

Figure 2:
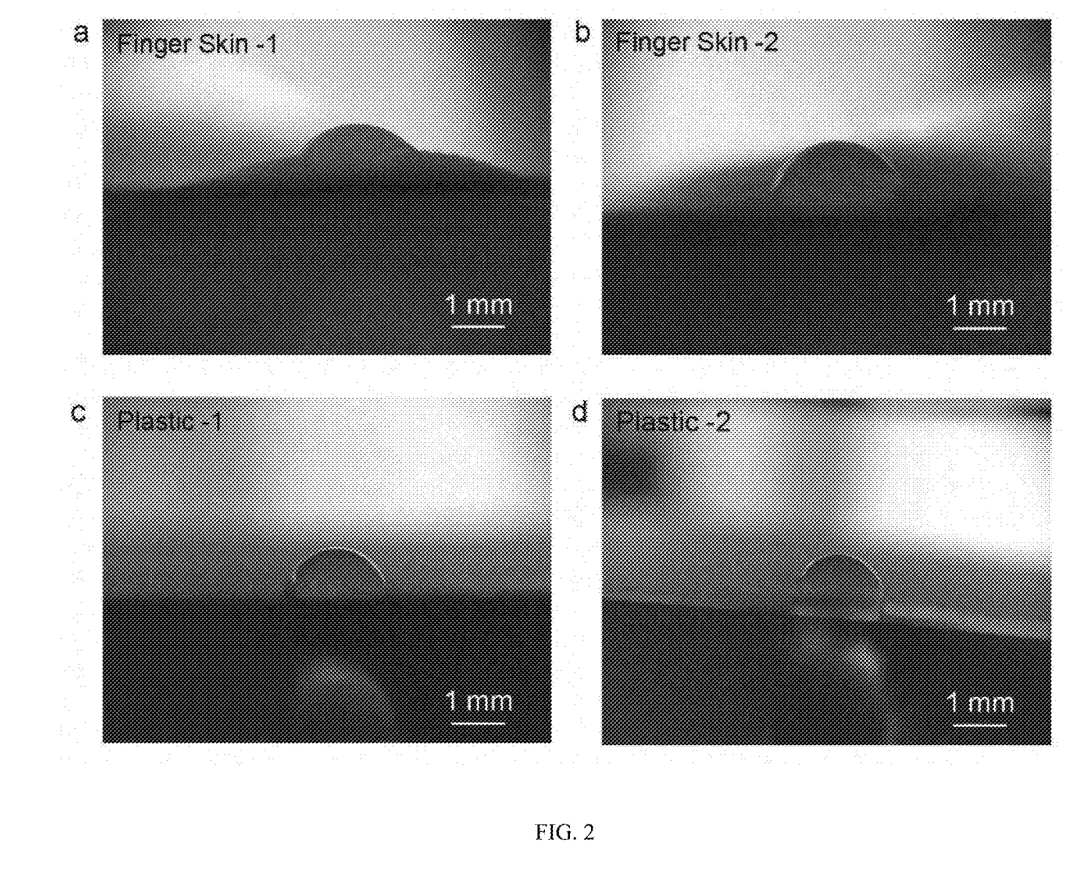
FIG. 2 shows exemplary smartphone images of droplets (a) and (b) on skin, and (c) and (d) on plastic. The lens used with a smartphone camera has a focal length of 8 mm. The wetting property of skin or plastic can be further analyzed by software on the smartphone.

FIG. 2 shows images of actual droplets (i.e., objects) on different surfaces (i.e., human skin a) and b); and plastic c) and d)) taken by the apparatus illustrated in FIG. 1. The side-wall of the adaptor and the contact angle of the droplet can be seen by the apparatus.

The entire apparatus can be very compact. The distance between the smartphone camera and the sample surface can be short, for example, at most 40 mm, 30 mm, 20 mm, 10 mm, or in a range between any of values.

The mirror used in the above embodiments can be, for example, a right-angle prism with its oblique plane coated with a reflective material including, for example, aluminum, silver, gold, copper, a high-index dielectric material, or a combination thereof.

The mirror used in the above embodiments can be, for example, a flat mirror lying on a tilted flat surface.

The position of the mirror used in the above embodiments can be above a surface that the object is on (i.e., small target such as droplet or the surface itself), and the reflective surface of the mirror intersects with the surface and the optical axis of measurement.

The position mirror used in the above embodiments can be, for example, below the surface where the small object is situated on if the surface is transparent, and the reflective surface of the mirror intersects with the surface and the optical axis of measurement.

A2. Surface Color Measurement

Another aspect of the disclosure provides an apparatus and methods to image and analyze the color of a surface, more particularly to make a color measurement insensitive to lighting. Another aspect of the disclosure provides a compact color calibration card (i.e., the reference color pattern) inside an optical adaptor to make a color measurement insensitive to a lighting.

Figure 3:
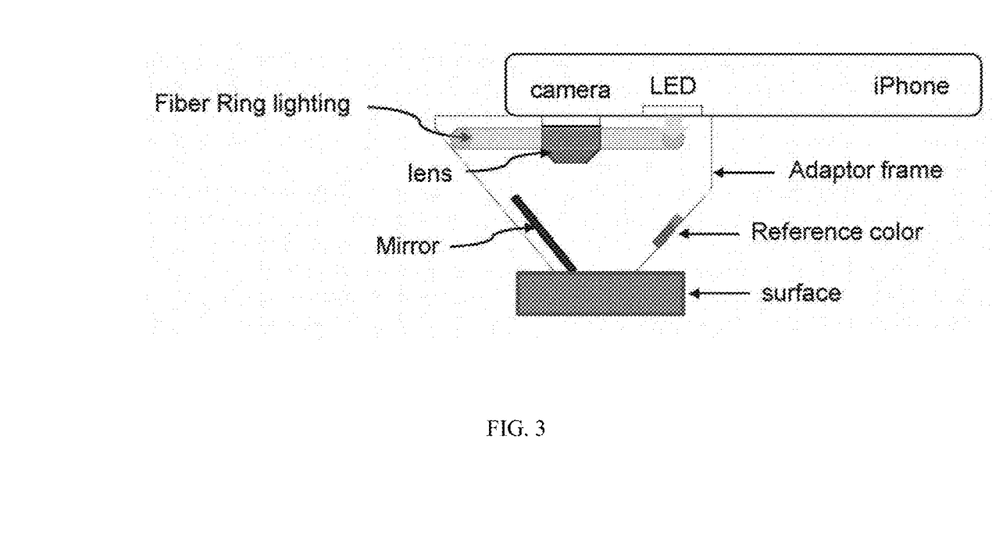
FIG. 3 shows a schematic of an optical system having smartphone to image and analyze the color of surface.

As shown in FIG. 3, there is a reference color pattern inside the adaptor. When imaging a sample surface, an adaptor is configured to make the reference color pattern or reference card, and the sample surface be imaged at the same time in a same field of view of the imager, e.g., the smartphone camera. The color of the sample surface can be analyzed with the help of the reference color pattern. The reference color pattern can minimize the error caused by the variation of illumination and camera setting of smartphone. The reference color pattern has a color pattern that is predetermined and known. The reference color pattern has been pre-characterized under different lighting conditions, so that by comparing the actual imaged surface with the reference color pattern, a true color of an object can be recovered from an image of the surface taken under a unknown light condition.

The apparatus can also be used to observe the color and detailed features of a hair on a surface. The hair can include, for example, head hair, and other body hair, and other sources of hair and hair-like fiber.

The apparatus can also be used to observe the color and detailed features of human or animal anatomy such as an ear or a nose by pressing the opening of the adaptor on the anatomy.

In some embodiments, the mirror and the reference color pattern can be placed in an single adaptor.

In some embodiments, multiple mirrors, multiple reference color patterns, or both, can be placed in an single adaptor.

According to one embodiment of the disclosure, an apparatus for measuring color of a surface, comprising: (a) an optical enclosure (also termed "adaptor), (b) a color reference, (c) light source, and (d) a camera.

The enclosure connects and houses the side-mirror, the light source, and the camera. The enclosure has an aperture or opening to fit or sit on a surface that has an object (such as a small liquid droplet), and the enclosure prevents or reduces ambient light getting inside of the enclosure during a measurement of the object. The color reference provides a predetermined color or color spectrum for comparison with the color of the object. The light source can be in close proximity to the object or surface, and can have a ring shape which is central-symmetric relative to the center of the camera. The camera can have, for example, an imaging sensor and imaging lens.

Other Examples

1. A device for illuminating and imaging an object, comprising:
   an imaging lens;
   a mirror;
   a ring-shape illuminator;
   an opening for sampling a surface;
   wherein the light illuminate the opening area by the ring illuminator;
   wherein the imaging lens collects light reflected by the mirror towards the camera in a smartphone.

2. A device for illuminating and imaging an object, comprising:
   an imaging lens;
   a mirror;
   a ring-shape illuminator;
   an opening for sampling a surface;
   a reference color pattern;
   wherein the reference color pattern and the sampling surface can be viewed in a same field of view of the smartphone camera.

3. A apparatus for illuminating and imaging an object, comprising:
   a smartphone comprising a camera and a light source;
   A device for illuminating and imaging an object, comprising:
   an imaging lens;
   a mirror;
   a ring-shape illuminator;
   an opening for sampling a surface;
   wherein the light emitted out of the light source of smartphone get coupled into the ring-shape illuminator.

4. The device, apparatus, or method of any prior embodiment, wherein the mirror can be beneath the imaging lens and optionally angled.

5. The device, apparatus, or method of any prior embodiment, wherein the mirror beneath the imaging lens can redirect the side view of the object to the image plane of the camera.

6. The device, apparatus, or method of any prior embodiment, wherein the mirror is tilted relative to the optical axis and the tilt angle in degrees can be, for example, 20, 30, 40, 50, 60, 70, 80, including intermediate values or ranges.
7. The device, apparatus, or method of any prior embodiment, wherein the ring-shape illuminator is made of a side-emitting fiber.
8. The device, apparatus, or method of any prior embodiment, wherein the imaging lens has a diameter in millimeters that is at least 2, 3, 4, 5, 10, 15, 20, 25, 30, 40, or 50 mm, including intermediate values or ranges.
9. The device, apparatus, or method of any prior embodiment, wherein the distance between the smartphone and sample in millimeters is at most 40, 30, 20, 10 mm, including intermediate values or ranges.
10. In some embodiments, the device, apparatus, or method of any prior embodiment, wherein the color reference pattern beneath the imaging lens redirects the side view of the object to the image plane camera.
11. In some embodiments, the device, apparatus, or method of any prior embodiment, wherein the color reference pattern is tilted relative to the optical axis and the tilt angle in degrees is 20, 30, 40, 50, 60, 70, 80, including intermediate values or ranges.
12. In some embodiments, the device, apparatus, or method of any prior embodiment, wherein the illuminator is made of an active light source.
13. In some embodiments, the surface of interest in the measurement is an area of human skin. The accurate skin absorption spectrum can be measured using the color reference. Hence the viewing color of the skin area under a different illumination spectrum can be predicted.

A-3. Method and Apparatus for Supporting Position Change of Light Source

Another aspect of the disclosure provides devices and methods that can connect a light source of a smartphone with an optical adaptor easily and flexibly using an optical fiber.

Figure 4:
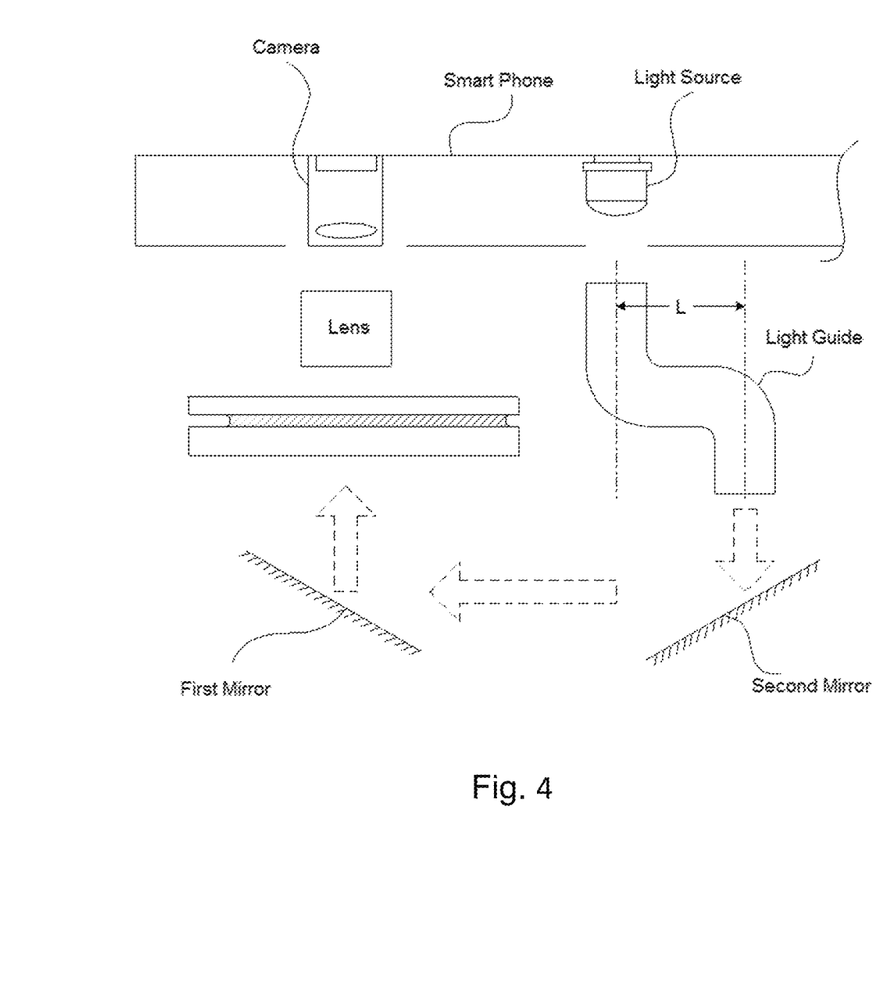
FIG. 4 shows a system for imaging an assaying device.

FIG. 4 shows a system for imaging an assaying device in accordance with some embodiments. In FIG. 4, a light guide receives light from a light source of the smartphone and then redirects the received light from the light source towards a second mirror. The second mirror reflects light received from the light guide towards the first mirror. The first mirror reflects light received from the second mirror towards the second plate of the assaying device. In response to the light reflected by the second mirror towards the second plate, some light transmits out of the first plate of the assaying device due to the light scattering of the liquid sample in the assaying device. Light transmitted out of the first plate of the assaying device is collected by the imaging lens, and the collected light is directed towards the camera in a smartphone.

Figure 5:
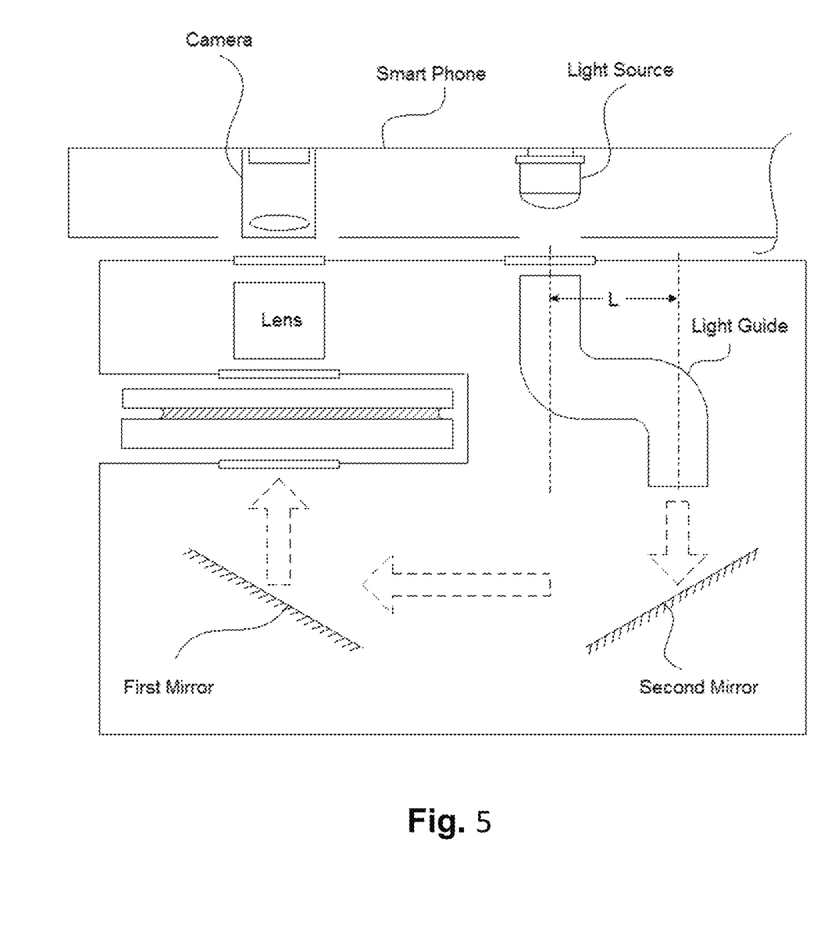
FIG. 5 shows an adaptor for imaging an assaying device.

FIG. 5 shows an adaptor for imaging an assaying device in accordance with some embodiments. The adaptor has a housing that can be attached to the smartphone. The adaptor has a light guide, a first mirror, a second mirror, and an imaging lens in its housing. Depending upon the implementations or designs, the imaging lens has a diameter that can be at least 2 mm, 3 mm, 4 mm, 5 mm, 10 mm, 15 mm, 20 mm, 25 mm, 30 mm, 40 mm, or 50 mm, or in a range between any of the two values. The housing of the adaptor has an entrance aperture, an exit aperture, a first exposure aperture, and a second exposure aperture. During operation, the light source of the smartphone emits light towards a first end of a light guide though the entrance aperture of the housing to cause light to transmit further towards the second end of the light guide. Light emitted by the second end of the light guide is used for illuminating the assaying device after such emitted light from the light guide is respectively reflected by the second mirror and the first mirror. When the assaying device is illuminated through the first exposure aperture, some light transmits out of the first plate of the assaying device due to the light scattering of the liquid sample in the assaying device. Light transmitted out of the first plate of the assaying device is collected by the imaging lens through the second exposure aperture, and the collected light is directed towards the camera in the smartphone.

Figure 6:
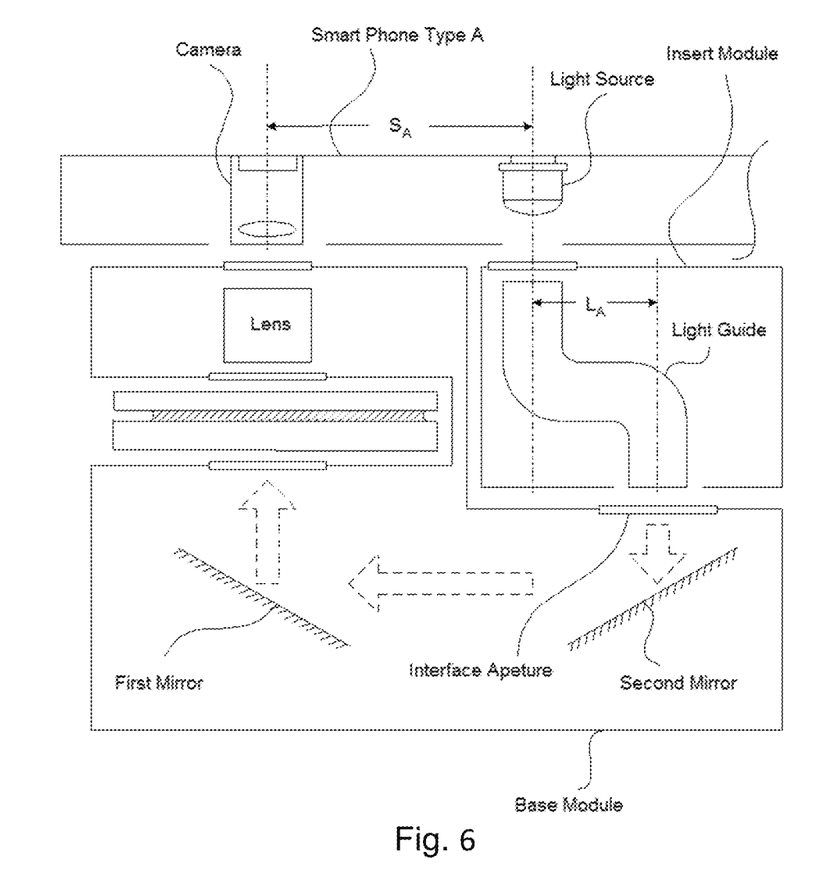
FIGS. 6 to 8 show schematics of adaptors for imaging an assaying device.
Figure 7:
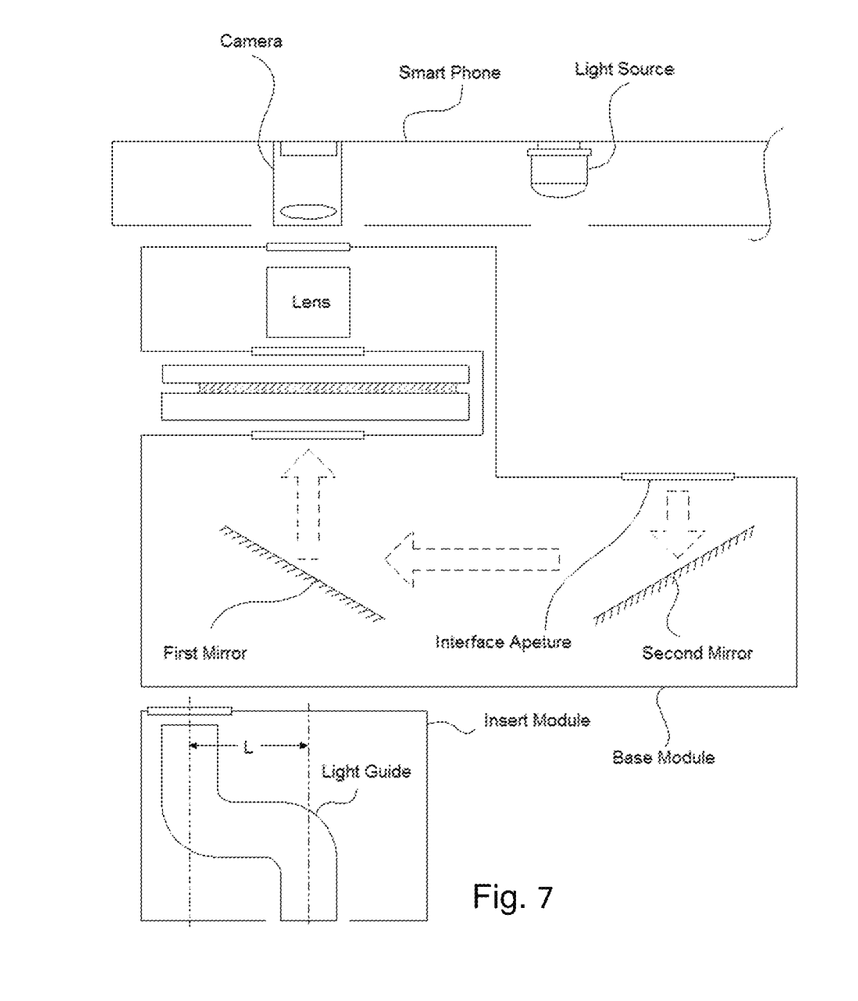
Figure 8:
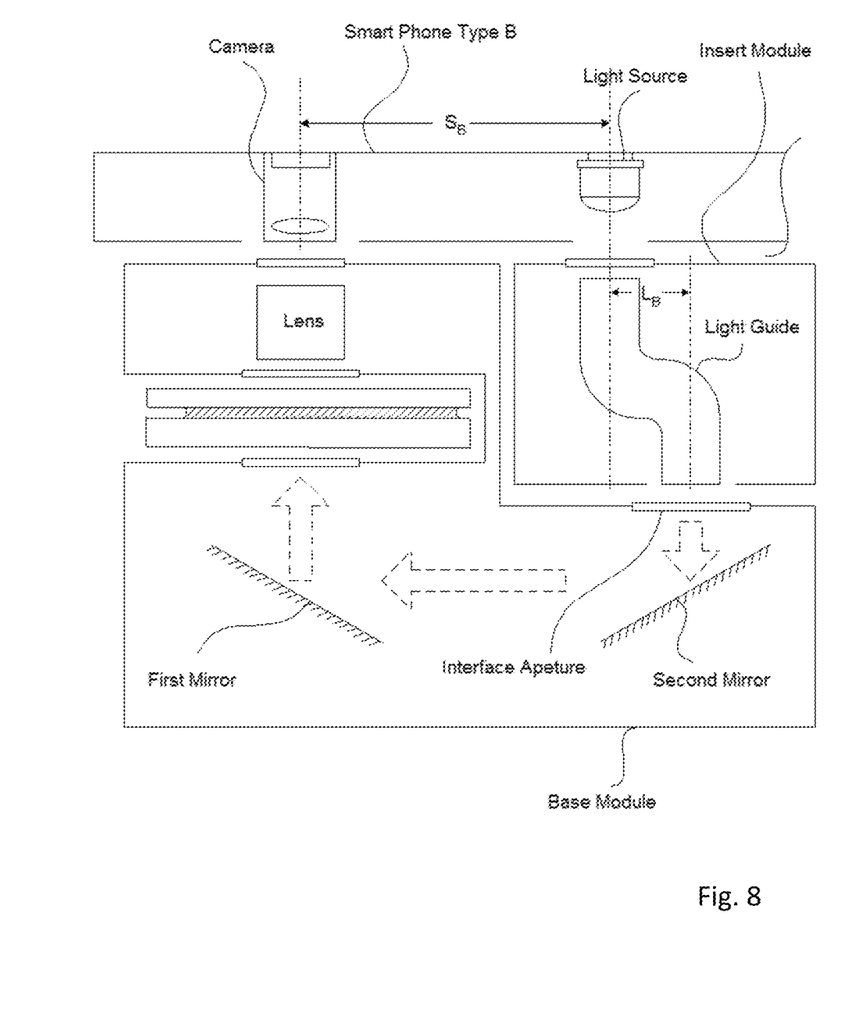

FIGS. 6-8 are schematics of adaptors for an imaging and assay device in accordance with some embodiments. In FIGS. 6-8, the adaptor includes a base module and an insert module. The base module includes the imaging lens, the first mirror, and the second mirror. The insert module includes the light guide. Depending upon the implementations or designs, the imaging lens can have a diameter that can be, for example, at least 2 mm, 3 mm, 4 mm, 5 mm, 10 mm, 15 mm, 20 mm, 25 mm, 30 mm, 40 mm, or 50 mm, or in a range between any of the two values. In FIG. 6, a first type of the insert module is combined with the base module to form an adaptor for using with a smartphone (i.e., Type A). In FIG. 7, the insert module is detached and separated from the base module. In FIG. 8, a second type of insert module is combined with the base module to form an adaptor for using with a smartphone (i.e., Type B). In the type A smartphone as shown in FIG. 6, the camera and the light source are separated by a distance SA. In the type B smartphone as shown in FIG. 8, the camera and the light source are separated by a distance SB. Despite that the distance SA in FIG. 6 and the distance SB in FIG. 8, the same base module can be used for both the Type A smartphone and the Type B smartphone for forming an adaptor when the same base module is combined with a corresponding insert module.

The insert module in FIG. 6 and FIG. 8 each has different shifted distance, along a direction parallel to the surface of the smartphone, between a first center in the first end of the light guide and a second center in the second end of the light guide. This shifted distance is, respectively, LA and LB for the insert module in FIG. 6 and FIG. 8. When the condition SA+LA=SB+LB is satisfied, the same base module can be used in the adaptor for the Type A smartphone and in the adaptor for the Type B smartphone.

In some embodiments, the shifted distance, along a direction parallel to the surface of the smartphone, between a first center in the first end of the light guide and a second center in the second end of the light guide can be selectively variable by selecting one insert module among a group of insert modules, such as insert modules as shown in FIG. 6 and FIG. 8. In some embodiments, this shifted distance can be selectively changed in a range of 2 mm to 40 mm. Depending upon the implementations or designs, this shifted distance can be at least 2 mm, 3 mm, 4 mm, 5 mm, 10 mm, 15 mm, 20 mm, 25 mm, 30 mm, 40 mm, or 50 mm, or in a range between any of the two values.

The adaptor as shown in FIG. 5 or any of FIGS. 6 to 8 can have many other embodiments, variations, or improvements. In some embodiments, the light guide can be formed by an optical fiber. In some embodiments, the adaptor can include an optical condenser configured to be placed in front of the light source of the smartphone to increase the optical coupling between the light source and the first end of the light guide.

In some embodiments, a housing can enclose the imaging lens, the first mirror, the second mirror, and the light guide while relying upon some apertures for receiving or transmitting light. For example, the housing can have an entrance aperture, an exit aperture, a first exposure aperture, and a second exposure aperture as shown in FIG. 5. In some embodiments, a housing for the base module can enclose the imaging lens, the first mirror, and the second mirror while relying upon some apertures for receiving or transmitting light. For example, the housing for the base module can have an interface aperture, an exit aperture, a first exposure aperture, and a second exposure aperture as shown in FIGS. 6 to 8. In FIGS. 6-8, any of the apertures in the adaptors can be covered with a window that is substantially transparent to the light wavelength of interests. In some embodiments, all these apertures can be covered with windows to avoid dirt and debris falling into the housing.

Examples of Light Guide for Different Light Source Positions.

1. A device for illuminating and imaging an object, comprising:
   an imaging lens;
   a first mirror;
   a second mirror;
   a light guide;
   a slot for holding an assaying device;
   wherein:
   the light guide receives light from a light source of a smartphone and redirect the received light towards the second mirror;
   the second mirror reflects light received from the light guide towards the first mirror;
   wherein the first mirror reflects light received from the second mirror towards the second plate of the assaying device; and
   the imaging lens collects light transmitted out of the first plate of the assaying device and direct the collected light towards the camera in a smartphone.

2. A device for illuminating and imaging an object, comprising:
   a base module having an imaging lens, a first mirror, and a second mirror;
   an insert module having a light guide;
   a slot for holding an assaying device;
   wherein the light guide receives light from a light source of a smartphone and redirect the received light towards the second mirror when the insert module is engaged with the base module;
   the second mirror reflects light received from the light guide towards the first mirror;
   the first mirror reflects light received from the second mirror towards the second plate of the assaying device; and
   the imaging lens collects light transmitted out of the first plate of the assaying device and direct the collected light towards the camera in a smartphone.

3. A method for illuminating and imaging a liquid sample between two parallel plates in an assaying device, the method comprising the steps of:
   (a) causing a light source of a smartphone to emit light towards a first end of a light guide to cause light transmitting towards a second end of the light guide;
   (b) directing light emitted by the second end of the light guide towards the second mirror;
   (c) reflecting light received from the second end of the light guide, by the second mirror, towards the first mirror;
   (d) reflecting light received from the second mirror, by the first mirror, towards the second plate of the assaying device; and
   (e) collecting light transmitted out of the first plate of the assaying device, by the imaging lens, to direct the collected light towards the camera in a smartphone.

4. A method for illuminating and imaging a liquid sample between two parallel plates in an assaying device, the method comprising the steps of:
   (a) joining an insert module with a base module, wherein the insert module includes a light guide, and wherein the base module includes an imaging lens, a first mirror, and a second mirror;
   (b) causing a light source of a smartphone to emit light towards a first end of a light guide to cause light transmitting towards a second end of the light guide after the insert module is joint with the base module;
   (c) directing light, emitted by the second end of the light guide in the insert module, towards the second mirror in the base module;
   (d) reflecting light received from the second end of the light guide in the insert module, by the second mirror in the base module, towards the first mirror in the base module;
   (e) reflecting light received from the second mirror, by the first mirror, towards the second plate of the assaying device; and
   (f) collecting light transmitted out of the first plate of the assaying device, with the imaging lens, to direct the collected light towards the camera in a smartphone.

5. The device, apparatus, or method of any prior embodiment, wherein:
   the light guide is formed by an optical fiber.

6. The device, apparatus, or method of any prior embodiment, further comprising:
   an optical condenser configured to be placed in front of the light source of the smartphone to increase the optical coupling between the light source and the first end of the light guide.

7. The device, apparatus, or method of any prior embodiment, further comprising:
   separating the insert module with the base module;
   joining an alternative insert module with the base module, wherein the alternative insert module includes a light guide that has a configuration different from the light guide in the insert module.

8. The device, apparatus, or method of any prior embodiment, wherein the imaging lens, the first mirror, the second mirror, and the light guide are placed inside a housing.

9. The device, apparatus, or method of any prior embodiment, wherein the light guide is placed inside a housing for the insert module.

10. The device, apparatus, or method of any prior embodiment, wherein the imaging lens, the first mirror, and the second mirror are placed inside a housing for the base module.

11. The device, apparatus, or method of any prior embodiment, wherein the imaging lens, the first mirror, and the second mirror are placed inside a housing for the base module; and wherein the housing includes an entrance aperture, an exit aperture, a first exposure aperture, and a second exposure aperture.

12. The device, apparatus, or method of any prior embodiment, wherein the imaging lens, the first mirror, and the second mirror are placed inside a housing for the base module; and the housing for the base module includes an interface aperture, an exit aperture, a first exposure aperture, and a second exposure aperture.

13. The device, apparatus, or method of any prior embodiment, wherein an interface aperture, an exit aperture, a first exposure aperture, and a second exposure aperture on the housing for the base module are covered with transparent window.

14. The device, apparatus, or method of any prior embodiment, comprising:
   causing a light source of a smartphone to emit light towards a first end of a light guide though an entrance aperture of the base module.

15. The device, apparatus, or method of any prior embodiment, comprising:
   directing light, emitted by the second end of the light guide in the insert module, towards the second mirror in the base module though an interface aperture of the base module.

16. The device, apparatus, or method of any prior embodiment, comprising:
   reflecting light received from the second mirror, by the first mirror, towards the second plate of the assaying device through a first exposure aperture of the base module.

17. The device, apparatus, or method of any prior embodiment, comprising:
   collecting light transmitted out of the first plate of the assaying device, by the imaging lens, through a second exposure aperture of the base module.

18. The device, apparatus, or method of any prior embodiment, comprising:
   collecting light transmitted out of the first plate of the assaying device, by the imaging lens, through a second exposure aperture of the base module; and
   directing the collected light, by the imaging lens, towards the camera in a smartphone through an exit exposure.

19. The device, apparatus, or method of any prior embodiment, wherein:
   a shifted distance, along a direction parallel to the surface of the smartphone, between a first center in the first end of the light guide and a second center in the second end of the light guide is selectively variable by selecting one insert module among a group of insert modules.

20. The device, apparatus, or method of any prior embodiment, wherein:
   a shifted distance, along a direction parallel to the surface of the smartphone, between a first center in the first end of the light guide and a second center in the second end of the light guide is selectively variable range, and the variable range is between 2 mm to 40 mm.

21. The device, apparatus, or method of any prior embodiment, wherein the variable range is at least 2 mm, 3 mm, 4 mm, 5 mm, 10 mm, 15 mm, 20 mm, 25 mm, 30 mm, 40 mm, or 50 mm, or in a range between any of the two values.

22. The device, apparatus, or method of any prior embodiment, wherein the imaging lens has a diameter that is at least 2 mm, 3 mm, 4 mm, 5 mm, 10 mm, 15 mm, 20 mm, 25 mm, 30 mm, 40 mm, or 50 mm, or in a range between any of the two values.

What is claimed is:

1. A device for imaging a side view of an object on a surface, comprising:
   (a) a housing; (b) a side-mirror; (c) a light source; and (d) a camera, wherein:
   the housing has an opening to position on a surface;
   the housing connects and houses the side-mirror, the light source, and the camera, in such a way that for the object on the surface, the camera images the sideview of the object by imaging the image of the side view of the object in the side mirror; and
   the side-mirror is on an angle off of the perpendicular direction of the surface.

2. The device of claim 1, further comprising a color calibration card in the housing, wherein the camera views the calibration card and at least a part of the surface in the same field of view.

3. The device of claim 1, wherein the side-mirror is tilted relative to the perpendicular direction of the surface, and the tilt angle in degrees is 50, 60, 70, 80, or in a range between any of the two values.

4. The device of claim 1, wherein the light source is a ring-shape illuminator comprising a side-emitting fiber and is formed into a ring shape.

5. The device of claim 1, wherein the distance between the camera and the surface is at most of 20 mm.

6. The device of claim 1, wherein the housing prevents or reduces the ambient light getting inside of the housing.

7. The device of claim 1, wherein the camera is a part of a smartphone.

8. The device of claim 1, wherein the object is a drop of a liquid on the surface.

9. The device of claim 1, wherein the object is a hair.

10. The device of claim 1, wherein the housing further comprises multiple mirrors, multiple reference color patterns, or both.

11. The device of claim 1, wherein the housing further comprises an aperture or apertures.

12. The device of claim 1, wherein the imaging uses machine learning.

13. The device of claim 1, wherein the camera has an imaging lens that has a diameter that is at least 2 mm, 3 mm, 4 mm, 5 mm, or in a range between any of the two values.

14. The device of claim 1, distance between the camera and the sample surface is in the range of 10 mm to 20 mm.

15. The device of claim 1, wherein the object is a drop of a liquid on the surface, and the imaging of the sideview of object is for measuring the contact angle of the liquid.

16. The device of claim 1, wherein the side-mirror is tilted relative to the perpendicular direction of the surface, and the tilt angle in degrees is 45.

17. The device of claim 1, wherein the side-mirror is tilted relative to the perpendicular direction of the surface, and the tilt angle in degrees is 20, 50, or any value between the two values.

18. The device of claim 1, wherein the side-mirror is tilted relative to the perpendicular direction of the surface, and the tilt angle in degrees is 50, 60, or any value between the two values.

19. The device of claim 1, wherein the distance between the camera and the surface is in a range from 20 mm to 40 mm.

20. A method of imaging a side view of an object on a surface, comprising:
   (a) providing a housing; a side-mirror; a light source; and a camera, wherein
   the housing has an opening to position on a surface; the housing connects and houses the side-mirror, the light source, and the camera, in such way that for an object on the surface, the sideview of an object is imaged by the camera through the side-mirror, and the side-mirror is on an angle off of the perpendicular direction of the surface;
   (b) placing the object on the surface; and
   (c) illuminating the object using the light source, and imaging, using the camera, the side view of the object, wherein the camera images the image of the side view of the object in the side mirror.

21. The method of claim 20, wherein the imaging uses machine learning.

22. The method of claim 20, further comprising a color calibration card in the housing, wherein the camera views the calibration card and at least a part of the surface in the same field of view.

23. The method of claim 20, wherein the housing prevents or reduces the ambient light getting inside of the housing.

24. The method of claim 20, wherein the object is a drop of a liquid on the surface.

25. The method of claim 20, wherein the object is a hair.

26. The method of claim 20, wherein the housing further comprises multiple mirrors, multiple reference color patterns, or both.

27. The method of claim 20, wherein the housing further comprises an aperture or apertures.

28. The method of claim 20, wherein the object is a liquid on a surface, and the method further comprises a step of measuring, from the images, the contact angle of the liquid on the surface.

29. The method of claim 20, wherein the object is a liquid droplet on a surface of mammalian skin.

30. The method of claim 20, wherein the light source is a ring-shape illuminator comprising a side-emitting fiber and is formed into a ring shape.

31. The methods of claim 20, wherein the side-mirror is tilted relative to the perpendicular direction of the surface, and the tilt angle in degrees is 45.

32. The methods of claim 20, wherein the side-mirror is tilted relative to the perpendicular direction of the surface, and the tilt angle in degrees is 20, 50, or any value between the two values.

33. The methods of claim 20, wherein the side-mirror is tilted relative to the perpendicular direction of the surface, and the tilt angle in degrees is 50, 60, 70, 80, or any value between the two values.

34. The methods of claim 20, wherein the distance between the camera and the surface is in a range from 20 mm to 40 mm.

35. The methods of claim 20, wherein the distance between the camera and the surface is at most 20 mm.

* * * * *